US012706457B2

(12) United States Patent
Hu et al.

(10) Patent No.: US 12,706,457 B2
(45) Date of Patent: Aug. 11, 2026

(54) HYBRID DC CHAINED ENERGY STORAGE CONVERTER AND CONTROL METHOD THEREOF

(71) Applicant: Delta Electronics (Shanghai) CO., LTD, Shanghai (CN)

(72) Inventors: Guangcheng Hu, Shanghai (CN); Yuncheng Wang, Shanghai (CN); Teng Liu, Shanghai (CN); Peng Xiao, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 902 days.

(21) Appl. No.: 18/145,053

(22) Filed: Dec. 22, 2022

(65) Prior Publication Data

US 2023/0208133 A1 Jun. 29, 2023

(30) Foreign Application Priority Data

Dec. 29, 2021 (CN) ........................ 202111642408.5

(51) Int. Cl.
*H02J 1/102* (2026.01)
*H02J 7/44* (2026.01)
*H02J 7/94* (2026.01)

(52) U.S. Cl.
CPC ................ *H02J 1/102* (2013.01); *H02J 7/44* (2026.01); *H02J 7/94* (2026.01)

(58) Field of Classification Search
CPC ...... H02J 1/102; H02J 7/44; H02J 7/94; H02J 2207/20; H02J 4/25; H02J 7/02;
(Continued)

(56) References Cited

U.S. PATENT DOCUMENTS

2018/0131290 A1 5/2018 Ng et al.
2020/0313554 A1* 10/2020 Liu ........................ H02J 1/102

FOREIGN PATENT DOCUMENTS

CN 107592017 A * 1/2018
CN 112087134 A * 12/2020 .......... H02M 3/1584
(Continued)

OTHER PUBLICATIONS

Notice of Allowance dated Feb. 5, 2025 of Chinese Application No. 2021116424085.
(Continued)

*Primary Examiner* — Julian D Huffman
*Assistant Examiner* — Aiman Bickiya
(74) *Attorney, Agent, or Firm* — Qinghong Xu

(57) ABSTRACT

Provided is a hybrid DC chained energy storage converter, including: a positive DC bus; a negative DC bus; a main circuit inductor; at least one high frequency sub module, including a first switch circuit and a first capacitor connected in parallel; a plurality of low frequency sub modules each including a second switch circuit and an energy storage element connected in parallel, the main circuit inductor, the at least one high frequency sub module and the plurality of low frequency sub modules being connected in series to form a series branch, and the series branch being connected to the positive DC bus and the negative DC bus, respectively; and a controller, coupled to the first switch circuit of the at least one high frequency sub module and second switch circuits of the plurality of low frequency sub modules, respectively.

20 Claims, 12 Drawing Sheets

(58) Field of Classification Search
CPC .... H02J 7/06; H02J 7/345; H02J 7/933; H02J 7/96; H02M 7/219; H02M 1/32
USPC .......................................................... 320/108
See application file for complete search history.

(56) References Cited

FOREIGN PATENT DOCUMENTS

| | | |
|---|---|---|
| CN | 112271746 A | 1/2021 |
| CN | 112737378 A | 4/2021 |

OTHER PUBLICATIONS

Gang Yao et al., Hybrid Modulation and Control Technology of Single Phase Multilevel Current Source Converter, Power System Technology, vol. 42, No. 4.

* cited by examiner

HYBRID DC CHAINED ENERGY STORAGE CONVERTER AND CONTROL METHOD THEREOF

CROSS REFERENCE

The present application claims the benefit of priority to the Chinese Patent Application NO. 202111642408.5, filed on Dec. 29, 2021, the contents of which are incorporated herein by reference in their entirety.

TECHNICAL FIELD

The present disclosure relates to the field of energy storage conversion, and in particular to a hybrid Direct Current (DC) chained energy storage converter and a control method thereof.

BACKGROUND

In recent years, with the development of an energy storage industry, an increasing number of energy storage projects have been put into use. In particular, in the context of new energy with goals of peak carbon dioxide emissions and carbon neutrality, the vigorous development and safe use of energy storage systems have gradually become the consensus of all.

However, conventional energy storage systems have different modes such as a large-scale centralized mode, a distributed mode and a mobile mode, which lead to some problems and defects in the energy storage systems.

For example, a huge number of battery cells are connected in series and parallel, and the inconsistency of the battery cells will cause circulating current loss and cask effect between the battery cells. There are defects in designs of thermal management systems, resulting in different battery performance degradation rates in different temperature zones, which will lead to potential safety hazards. The timeliness of safety pre-warning is not high with obvious hysteresis, and when systems detect abnormalities, battery thermal runaway reactions have already begun. The centralized arrangement of energy storage batteries makes it impossible for a single faulty battery to be bypassed, and local thermal runaway will spread rapidly, causing the expand of the failure to catch a fire.

Therefore, it is necessary to guarantee the safety of battery energy storage power stations during operation, eliminate the circulating current loss and the cask effect between the battery cells, improve the designs of the thermal management systems, improve the timeliness of safety pre-warning, and effectively bypass the faulty battery.

When cycle efficiencies of energy storage systems with different structures are compared, it can be found that in a conventional low-voltage Direct Current (DC) chained energy storage system as shown in FIG. 1A, battery modules are decentralized, and are connected to a DC low-voltage bus via converters, which is beneficial to system security. However, a step-up transformer increases the volume and cost of the system, and the efficiency of the system is low after two-stage power conversion.

Compared with such low-voltage DC chained energy storage system, a medium-voltage DC chained energy storage system can greatly improve the cycle efficiency from a power generation end to an energy storage end.

However, in a conventional transformerless cascaded H-bridge converter as shown in FIG. 1B, cascaded battery full-bridge modules are connected to a medium-voltage AC power grid, and batteries are controlled in groups, which is beneficial to the system security. However, the full-bridge module has twice the power fluctuation, which adversely affects a battery life.

In addition, a conventional commonly used constant current and constant voltage charging method is not conducive to the long-term cycle use of the battery. Although the use of a pulse charging method can effectively reduce a polarization phenomenon and prolong the cycle life of the battery. However, the pulse charging of a large number of batteries will have an impact on the power grid and cannot be practical.

Research results in recent years have shown that hybrid DC chained energy storage converters are more suitable for the development of modern urban distribution networks, but there is no mature technical solution to achieve the above functions at present.

SUMMARY

The present disclosure provides a hybrid DC chained energy storage converter capable of solving a problem of battery thermal management.

A hybrid DC chained energy storage converter of the present disclosure may include: a positive DC bus; a negative DC bus; a main circuit inductor; at least one high frequency sub module, including a first switch circuit and a first capacitor, wherein the first switch circuit is connected in parallel with the first capacitor; a plurality of low frequency sub modules, wherein each low frequency sub module includes a second switch circuit and an energy storage element, the second switch circuit is connected in parallel with the energy storage element, the main circuit inductor, the at least one high frequency sub module and the plurality of low frequency sub modules are connected in series to form a series branch, and the series branch is connected to the positive DC bus and the negative DC bus, respectively; and a controller, coupled to the first switch circuit of the at least one high frequency sub module and the second switch circuits of the plurality of low frequency sub modules, respectively, wherein the controller is configured to control the first switch circuit of the at least one high frequency sub module according to a current flowing through the main circuit inductor, and control the second switch circuits of the plurality of low frequency sub modules according to a voltage across the first capacitor of the at least one high frequency sub module and voltages of a plurality of energy storage elements.

There is provided a method for controlling a hybrid DC chained energy storage converter in the present disclosure, wherein the hybrid DC chained energy storage converter may include: a positive DC bus; a negative DC bus; a main circuit inductor; at least one high frequency sub module, including a first switch circuit and a first capacitor, wherein the first switch circuit is connected in parallel with the first capacitor; and a plurality of low frequency sub modules, wherein each low frequency sub module includes a second switch circuit and an energy storage element, the second switch circuit is connected in parallel with the energy storage element, the main circuit inductor, the at least one high frequency sub module and the plurality of low frequency sub modules are connected in series to form a series branch, and the series branch is connected to the positive DC bus and the negative DC bus, respectively; the control method includes: detecting a current flowing through the main circuit inductor; controlling the first switch circuit of the at least one high frequency sub module according to the current flowing through the main circuit inductor; detecting a voltage across the first capacitor of the at least one high frequency sub module; detecting the voltages of the plurality of energy storage element; and controlling the second switch circuits of the plurality of low frequency sub modules according to the voltage across the first capacitor of the at least one high frequency sub module and voltages of a plurality of energy storage elements.

DETAILED DESCRIPTION

Figure 1A:
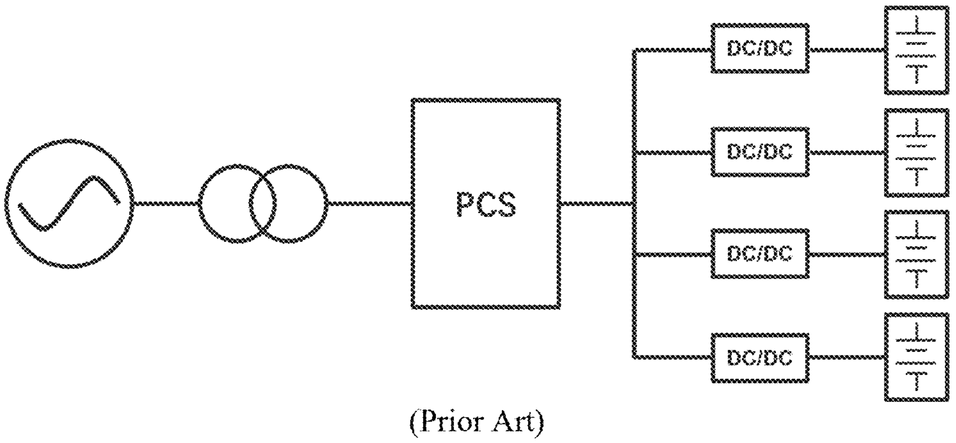
FIG. 1A is a circuit diagram showing a conventional low-voltage DC chained energy storage system.
Figure 1B:
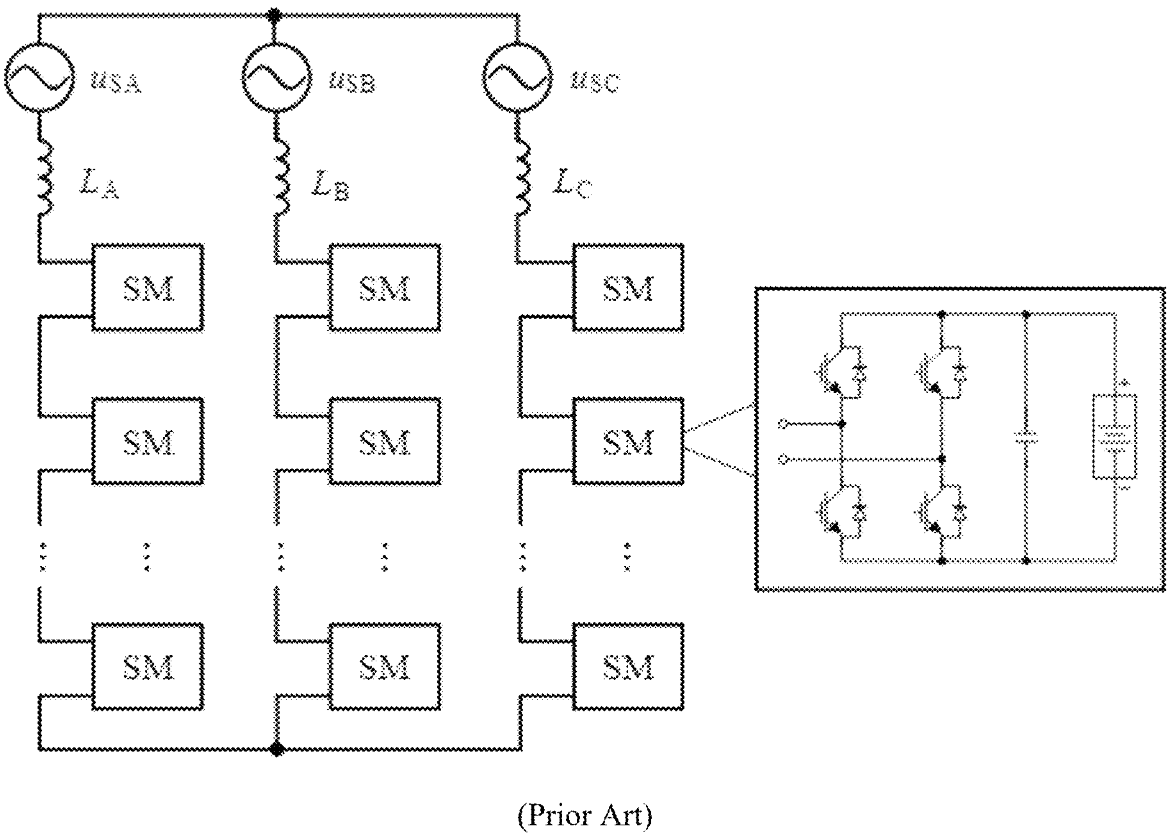
FIG. 1B is a circuit diagram showing a conventional transformerless cascaded H-bridge converter.

Hereinafter, embodiments disclosed in the present specification will be described in detail with reference to the drawings. Here, the same or similar structural elements are assigned the same reference numerals, and repeated descriptions thereof will be omitted. Suffixes "part" and "portion" for the structural elements used in the following description are given or used in a mixed manner only for the sake of convenience in writing the specification, and do not have meanings or functions that distinguish themselves from the other.

In addition, in the process of describing the embodiments disclosed in the present disclosure, if it is determined that the specific description of the related well-known technologies may obscure the technical idea of the embodiments disclosed in this specification, the detailed description thereof will be omitted. Moreover, the attached drawings are only for easy understanding of the embodiments disclosed in this specification, the technical idea disclosed in the present disclosure should not be limited by the attached drawings, and all changes, equivalents and substitutes included in the idea and technical scope of the present disclosure should be covered.

The terms including ordinal numeral, such as first, second, etc. may be used to describe various structural elements, but the structural elements are not defined by the terms. The terms are used only for the purpose of distinguishing one structural element from other structural elements.

If it is mentioned that a certain structural element is "connected" to or "in contact" with another structural element, it may be directly connected to or in contact with the other structural element, but it can also be understood that there are other structural elements between them. Conversely, if it is mentioned that a certain structural element is "directly connected" to or "directly in contact" with another structural element, it should be understood that there is no other structural element between them.

Unless the context clearly indicates otherwise, expressions in the singular shall include expressions in the plural.

In the present disclosure, the terms such as "including or comprising" or "having" are only intended to specify the existence of features, numbers, steps, actions, structural elements, components or a combination thereof recited in the specification, and are not intended to exclude the possibility of the presence or addition of one or more other features, numbers, steps, actions, structural elements, components or a combinations thereof.

In addition, it can be understood that all embodiments of the present disclosure may be performed alone or in combination with other embodiments and are considered to be within the scope of the present disclosure.

The present disclosure provides a hybrid DC chained energy storage converter capable of solving a problem of battery thermal management.

Another objective of the present disclosure is further to provide a hybrid DC chained energy storage converter capable of solving a problem of low battery cycle efficiency.

Another objective of the present disclosure is further to provide a hybrid DC chained energy storage converter capable of solving a problem of fast battery life and capacity fading.

Another objective of the present disclosure is further to provide a hybrid DC chained energy storage converter capable of solving a problem of an impact of pulse charging on a power grid.

Figure 2:
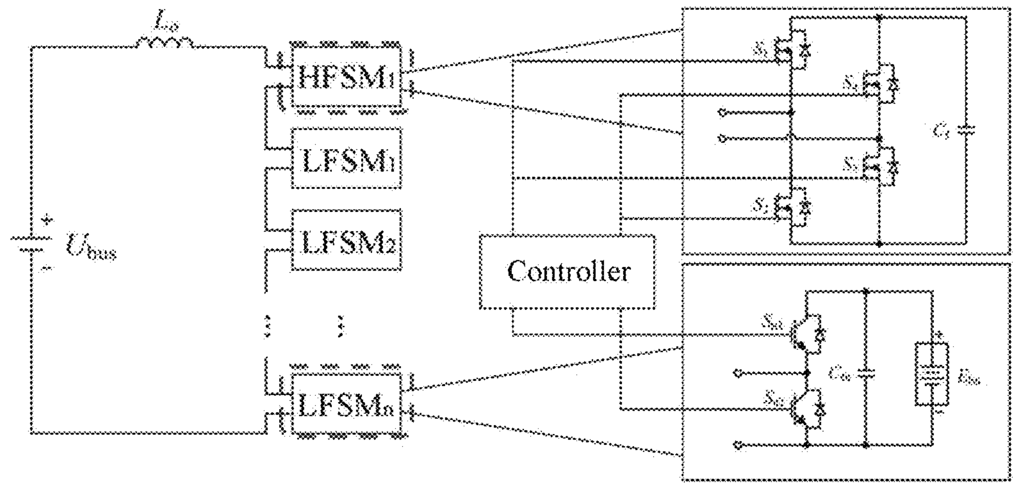
FIG. 2 is a circuit diagram showing a first embodiment of a hybrid DC chained energy storage converter of the present disclosure.

FIG. 2 is a circuit diagram showing a first embodiment of a hybrid DC chained energy storage converter of the present disclosure.

The hybrid DC chained energy storage converter according to the first embodiment of the present disclosure includes: a positive DC bus $U_{bus}+$; a negative DC bus $U_{bus}-$; a main circuit inductor $L_o$; at least one High Frequency Sub Module (HFSM), including a first switch circuit and a first capacitor $C_f$, the first switch circuit being connected in parallel with the first capacitor $C_f$; and a plurality of Low Frequency Sub Modules (LFSMs) $LFSM_1$ to $LFSM_n$, wherein n is a positive integer greater than 1, each low frequency sub module including a second switch circuit and an energy storage element $E_{bn}$, and the second switch circuit being connected in parallel with the energy storage element $E_{bn}$. The main circuit inductor $L_o$, the at least one high frequency sub module and the low frequency sub modules $LFSM_1$ to $LFSM_n$ are connected in series to form a series branch, and the series branch is connected in series with the positive DC bus $U_{bus}+$ and the negative DC bus $U_{bus}-$, respectively. A controller is coupled to the first switch circuit of the at least one high frequency sub module and second switch circuits of the plurality of low frequency sub modules, respectively, and is configured to control an action of the first switch circuit of the at least one high frequency sub module according to a current of the main circuit inductor $L_o$, and control actions of the second switch circuits of the plurality of low frequency sub modules according to a voltage of the first capacitor $C_f$ of the at least one high frequency sub module and voltages of a plurality of energy storage elements.

In the hybrid DC chained energy storage converter of the present disclosure, the at least one high frequency sub module may include one high frequency sub module $HFSM_1$ (as shown in FIG. 2), or may include a plurality of high frequency sub modules.

In the hybrid DC chained energy storage converter of the present disclosure, the first switch circuit may be a full-bridge circuit. The high frequency sub module $HFSM_1$ includes the full-bridge circuit and the first capacitor $C_f$, and the full-bridge circuit includes switches $S_1$, $S_2$, $S_3$ and $S_4$ and diodes connected in anti-parallel with the switches $S_1$, $S_2$, $S_3$ and $S_4$, respectively. The switches $S_1$ and $S_2$ are connected in series to form a first bridge arm, the switches $S_3$ and $S_4$ are connected in series to form a second bridge arm, a midpoint of the first bridge arm and a midpoint of the second bridge arm form connection ports of the high frequency sub module $HFSM_1$, and the first bridge arm and the second bridge arm are connected in parallel with the first capacitor $C_f$, respectively.

In the hybrid DC chained energy storage converter of the present disclosure, all of the plurality of energy storage elements $E_{bn}$ may include battery packs or the combination of the battery packs and super capacitors.

In addition, in the hybrid DC chained energy storage converter of the present disclosure, the second switch circuit may be a half-bridge circuit or a full-bridge circuit. For example, all of the second switch circuits may be half-bridge circuits or full-bridge circuits, or a part of the second switch circuits is the half-bridge circuit and the other part is the full-bridge circuit.

In the first embodiment of the present disclosure, the second switch circuits are all the half-bridge circuits. As shown in FIG. 2, the low frequency sub module $LFSM_n$ includes the half-bridge circuit and the energy storage element, the half-bridge circuit includes switches $S_{n1}$, $S_{n2}$ and diodes connected in anti-parallel with the switches $S_{n1}$, $S_{n2}$, respectively, the switches $S_{n1}$ and $S_{n2}$ are connected in series to form a bridge arm, two ends of the switch $S_{n2}$ form connection ports of the low frequency sub module $LFSM_n$, and the bridge arm is connected in parallel with the energy storage element $E_{bn}$.

In addition, in the first embodiment of the present disclosure, the low frequency sub module $LFSM_n$ further includes a second capacitor $C_{fn}$ connected in parallel with the energy storage element $E_{bn}$. The controller can control a voltage across the second capacitor $C_{fn}$ through the second switch circuit.

Other low frequency sub modules $LFSM_1$ to $LFSM_{n-1}$ may also be constructed in the same manner as the low frequency sub module $LFSM_n$.

In FIG. 2, one HFSM and n LFSMs are connected to the main circuit inductor $L_o$ and the DC bus $U_{bus}$ in a cascaded manner. In this embodiment, the controller is used to control an action of the full-bridge circuit of the high frequency sub module $HFSM_1$, and in turn control the current flowing through the main circuit inductor $L_o$ and the voltage across the first capacitor $C_f$, so as to ensure the hybrid DC chained energy storage converter has a relatively small current ripple and smooth power transmission, so that a current flowing through the first capacitor $C_f$ is a high frequency square wave current with an average value of zero, and the connection port of the high frequency sub module $HFSM_1$ has a high frequency square wave voltage with an average voltage of zero. Since the switches $S_1$, $S_2$, $S_3$ and $S_4$ of the full-bridge circuit are in a high frequency switching state, the current ripple of the main circuit inductor $L_o$ can be effectively controlled, and the volume and weight of the main circuit inductor $L_o$ can be reduced. The controller is used to control actions of half-bridge circuits of the plurality of low frequency sub modules, for example, the controller is used to adjust duty cycles of the switches $S_{n1}$ and $S_{n2}$ and balance voltages of energy storage elements of the plurality of low frequency sub modules. An inductor is omitted from the low frequency sub module, thereby reducing the volume of the low frequency sub module and the cost of the hybrid DC chained energy storage converter. In addition, in the half-bridge circuit, the switches $S_{n1}$ and $S_{n2}$ are in a low frequency switching state, and a voltage of the connection port of the low frequency sub module is a low frequency square wave, which helps to reduce the switching loss of the switches $S_{n1}$ and $S_{n2}$ and improve the efficiency of the hybrid DC chained energy storage converter. Voltages of connection ports of the plurality of low frequency sub modules are phase-shifted with each other, which jointly form a voltage of a lumped port of the low frequency sub modules to be a low frequency square wave voltage with an average value of a DC bus voltage. The controller controls the half-bridge circuit to charge the energy storage element by means of pulse charging, which reduces a polarization effect of the battery and prolongs a service life of the battery.

Figure 3:
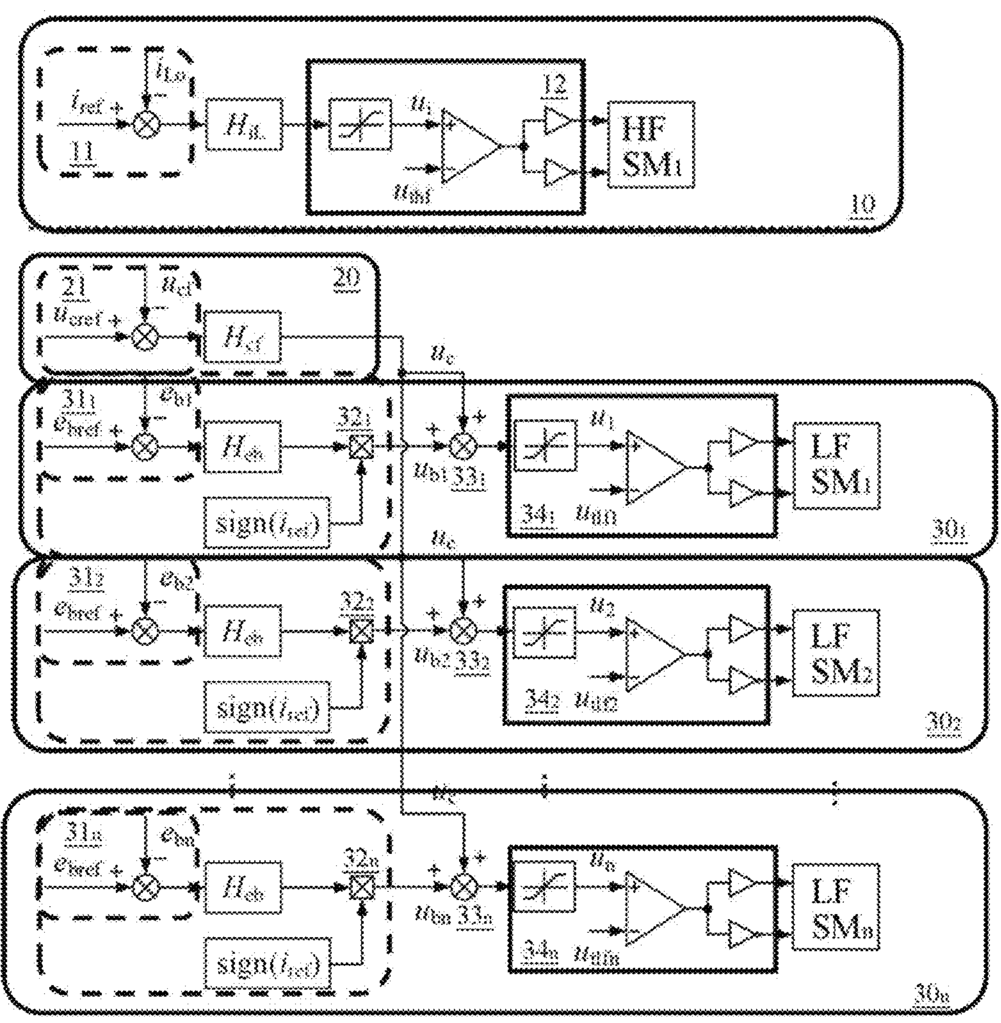
FIG. 3 is a circuit diagram showing a controller of a hybrid DC chained energy storage converter of the present disclosure.

FIG. 3 is a circuit diagram showing a controller of a hybrid DC chained energy storage converter of the present disclosure.

In the hybrid DC chained energy storage converter of the present disclosure, the controller may include: an inductor current control unit 10, configured to receive the current $i_{Lo}$ of the main circuit inductor $L_o$ and a current reference value $i_{ref}$ and output a first control signal to control the action of the full-bridge circuit of the high frequency sub module $HFSM_1$, wherein the current reference value $i_{ref}$ can be a current instruction sent by a Battery Management System (BMS); a capacitor voltage control unit 20, configured to receive the voltage $u_{cf}$ of the first capacitor $C_f$ of the high frequency sub module $HFSM_1$ and a first voltage reference value $U_{cref}$ and output a modulation voltage $u_c$; and energy storage voltage control units $\mathbf{30}_1$ to $\mathbf{30}_n$ in a one-to-one correspondence with the low frequency sub modules $LFSM_1$ to $LFSM_1$, configured to receive the modulation voltage tie, voltages $e_{bn}$ of energy storage elements $E_{bn}$ corresponding to the energy storage voltage control units and a second voltage reference value $e_{bref}$ and output a second control signal to control actions of half-bridge circuits of the low frequency sub modules $LFSM_1$ to $LFSM_n$.

In addition, in the present disclosure, it should be noted that second voltage reference values $e_{bref}$ of the energy storage voltage control units $\mathbf{30}_1$ to $\mathbf{30}_n$ may be the same or different. Setting the same second voltage reference value $e_{bref}$ can simplify the circuit. Setting different second voltage reference values $e_{bref}$ can utilize the battery in echelons, and different types of recycling batteries can be connected.

In the inductor current control unit 10 of the controller of FIG. 3, the inductor current control unit 10 may further include a first calculation unit (shown as a dotted frame in FIG. 3) 11, a current loop regulator $H_{iL}$ and a first generation unit (shown as a solid frame in FIG. 3) 12. The first calculation unit 11 is configured to receive the current $i_{Lo}$ flowing through the main circuit inductor $L_o$ and the current reference value $i_{ref}$ and calculate a current calculation value, the current loop regulator $H_{iL}$ is configured to receive the current calculation value and output a first voltage $u_i$, which is a modulated wave, and the first generation unit 12 is configured to receive the first voltage $u_i$ and a first carrier signal $U_{thf}$ and output the first control signal to control actions of the switches $S_1$, $S_2$, $S_3$ and $S_4$ of the high frequency sub module $HFSM_1$.

In the capacitor voltage control unit 20 of the controller of FIG. 3, the capacitor voltage control unit 20 may further include a second calculation unit 21 and a capacitor voltage loop regulator $H_{cf}$. The second calculation unit 21 is configured to receive the voltage $u_{cf}$ of the first capacitor $C_f$ and the first voltage reference value $u_{cref}$ and calculate a first voltage calculation value, and the capacitor voltage loop regulator $H_{cf}$ is configured to receive the first voltage calculation value and output the modulation voltage $u_c$.

In the energy storage voltage control units $\mathbf{30}_1$ to $\mathbf{30}_n$ of the controller in FIG. 3, each energy storage voltage control unit may further include a third calculation unit, an energy storage voltage loop regulator $H_{eb}$, a fourth calculation unit, a fifth calculation unit and a second generation unit. In the following, taking the energy storage voltage control unit $\mathbf{30}_n$ as an example, the third calculation unit $\mathbf{31}_n$ is configured to receive a voltage $e_{bn}$ of a corresponding energy storage element $E_{bn}$ and a second voltage reference value $e_{bref}$ and calculate a second voltage calculation value, the energy storage voltage loop regulator $H_{eb}$ is configured to receive the second voltage calculation value and output a second voltage, the fourth calculation unit $\mathbf{32}_n$ is configured to receive the second voltage and a symbol value Sign ($i_{ref}$) of the current reference value $i_{ref}$ and calculate a third voltage calculation value $u_{bn}$, the fifth calculation unit $\mathbf{33}_n$ is configured to receive the third voltage calculation value $u_{bn}$ and the modulation voltage $u_c$ and calculate a fourth voltage calculation value $u_n$, which is a modulated wave, and the second generation unit $\mathbf{34}_n$ is configured to receive the fourth voltage calculation value $u_n$ and a second carrier signal $u_{tlfn}$ and output the second control signal to control actions of the switches $S_{n1}$ and $S_{n2}$ of the low frequency sub module $LFSM_n$.

Other energy storage voltage control units $\mathbf{30}_1$ to $\mathbf{30}_{n-1}$ in a one-to-one correspondence with the low frequency sub modules $LFSM_1$ to $LFSM_{n-1}$ may be constructed in the same manner as the energy storage voltage control unit $\mathbf{30}_n$ corresponding to the low frequency sub modules $LFSM_n$.

Likewise, the energy storage voltage loop regulator $H_{eb}$ of each energy storage voltage control unit may be the same or different.

Through the hybrid DC chained energy storage converter of the first embodiment of the present disclosure as described above, it can be known that since an inductor is omitted from the low frequency sub module, the volume of the low frequency sub module and the system cost are reduced. In addition, since the switch of the second switch circuit of the low frequency sub module is in the low frequency state, the switching loss of the switch of the second switch circuit is reduced, and the efficiency of the hybrid DC chained energy storage converter is improved. Moreover, the second switch circuit of the low frequency sub module provides the battery pack with the pulse charging method, which reduces the polarization effect of the battery and prolongs the service life of the battery.

Furthermore, an output port voltage of a single LFSM is a low frequency square wave. Voltages of connection ports of n low frequency sub modules are phase-shifted with each other, which jointly form the voltage of the lumped port of the low frequency sub modules to be the low frequency square wave voltage with the average value of the DC bus voltage. A low frequency component's frequency of the DC bus voltage is n times a switching frequency of the switch of the second switch circuit, and a high frequency component's frequency of the DC bus voltage is a switching frequency of the switch of the first switch circuit.

Figure 4:
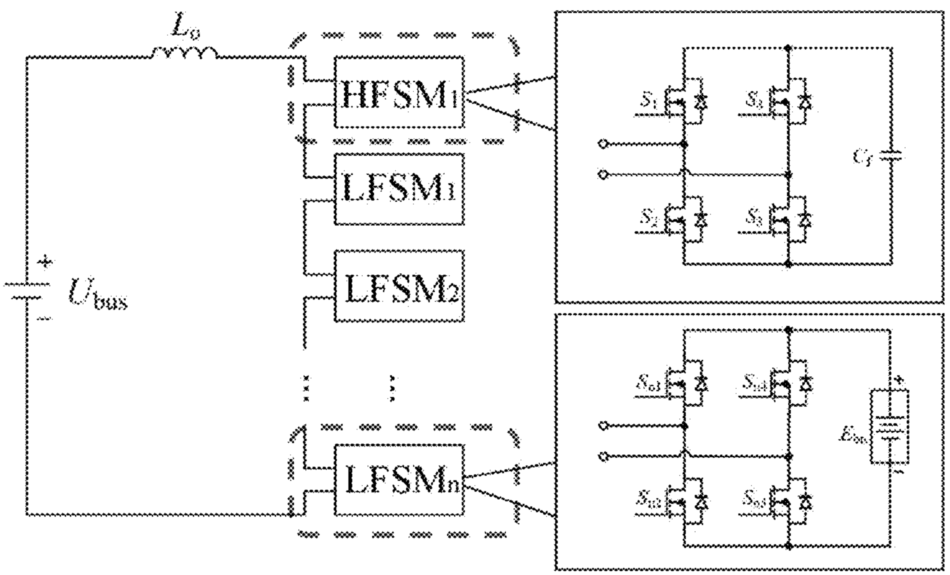
FIG. 4 is a circuit diagram showing a second embodiment of a hybrid DC chained energy storage converter of the present disclosure.

FIG. 4 is a circuit diagram showing a second embodiment of a hybrid DC chained energy storage converter of the present disclosure.

Different from the first embodiment of FIG. 2 in which the second switch circuits are all the half-bridge circuits, in the second embodiment of FIG. 4, the second switch circuits of the low frequency sub module LFSM all adopt the full-bridge circuits to control voltages of the energy storage elements $E_{bn}$. The full-bridge circuit includes switches $S_{n1}$, $S_{n2}$, $S_{n3}$ and $S_{n4}$ and diodes connected in anti-parallel with the switches $S_{n1}$, $S_{n2}$, $S_{n3}$ and $S_{n4}$, respectively, the switches $S_{n1}$ and $S_{n2}$ are connected in series to form a first bridge arm, the switches $S_{n3}$ and $S_{n4}$ are connected in series to form a second bridge arm, a midpoint of the first bridge arm and a midpoint of the second bridge arm form connection ports of the low frequency sub module, and the first bridge arm and the second bridge arm are connected in parallel with the energy storage element $E_{bn}$. The use of the full-bridge circuit can have a function of resisting the short circuit of the switches (switches $S_{n4}$ and/or $S_{n1}$) of an upper bridge arm, realize the low voltage ride-through of the DC short circuit, and improve the system reliability. The use of the full-bridge circuit can also provide the energy storage element $E_{bn}$ with a positive and negative pulse charging method, and further prolongs the battery life. In some embodiments, by increasing the number of low frequency sub modules, a certain margin for the low frequency sub module can be maintained, so that a duty cycle of the pulse charging of the battery pack can be optimally maintained, thereby prolonging the service life of the battery.

Figure 5:
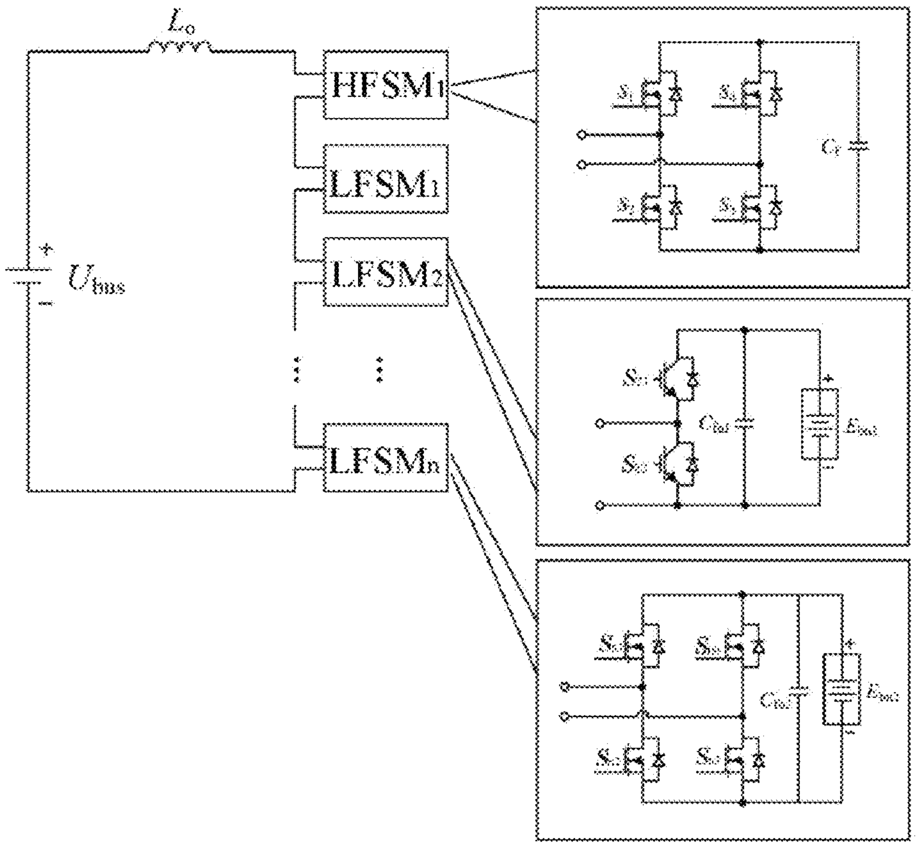
FIG. 5 is a circuit diagram showing a third embodiment of a hybrid DC chained energy storage converter of the present disclosure.

FIG. 5 is a circuit diagram showing a third embodiment of a hybrid DC chained energy storage converter of the present disclosure.

Different from the first embodiment of FIG. 2 in which the second switch circuits are all the half-bridge circuits and the second embodiment of FIG. 4 in which the second switch circuits are all the full-bridge circuits, in the third embodiment of FIG. 5, a part of the second switch circuits in the low frequency sub modules is the half-bridge circuit and the other part of the second switch circuits is the full-bridge circuit. That is, the third embodiment is an embodiment in which the first embodiment and the second embodiment are combined.

In the third embodiment, a proportion between the half-bridge circuits and the full-bridge circuits in the low frequency sub modules can be reasonably allocated, for example, about 50%, and the low voltage ride-through of the DC short circuit can still be realized, and the system reliability can be improved.

In some embodiments of the present disclosure, the full-bridge circuit can output a negative voltage, which can offset a positive voltage of a part of the half-bridge circuits, in order to achieve a purpose of adjusting a duty cycle of the converter, so that the pulse charging of the battery pack can be maintained at an optimal duty cycle.

Figure 6:
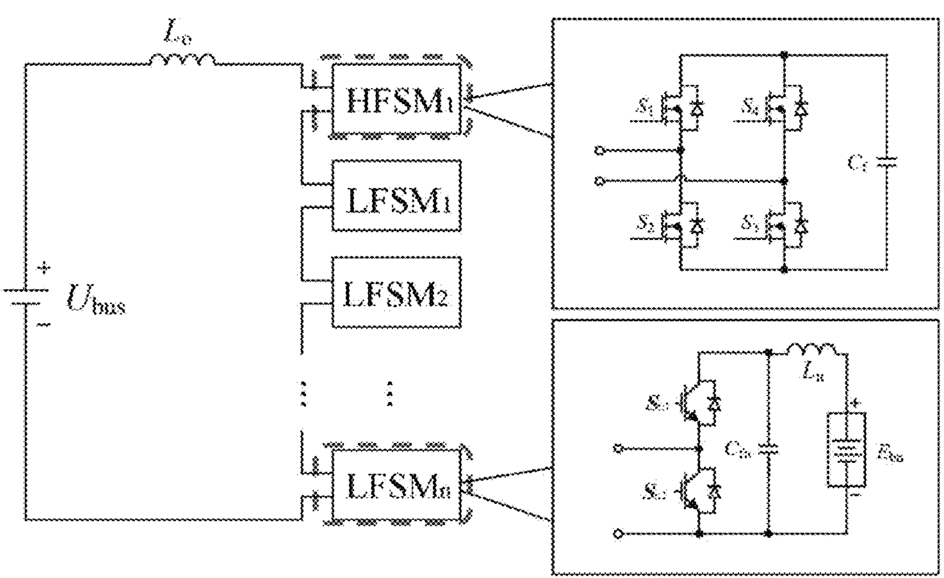
FIG. 6 is a circuit diagram showing a fourth embodiment of a hybrid DC chained energy storage converter of the present disclosure.

FIG. 6 is a circuit diagram showing a fourth embodiment of a hybrid DC chained energy storage converter of the present disclosure.

As shown in FIG. 6, the hybrid DC chained energy storage converter of the fourth embodiment is applied to a constant current charging mode. Different from the pulse charging method provided in the first embodiment, the fourth embodiment can meet a constant current charging requirement of the battery. That is, the hybrid DC chained energy storage converter of the fourth embodiment may further include an inductor $L_n$ in the low frequency sub module of the first embodiment, and the inductor $L_n$ is connected to the energy storage element $E_{bn}$ and the second capacitor $C_{fn}$, respectively, which ensures the continuity of the current for charging the battery pack.

Figure 7:
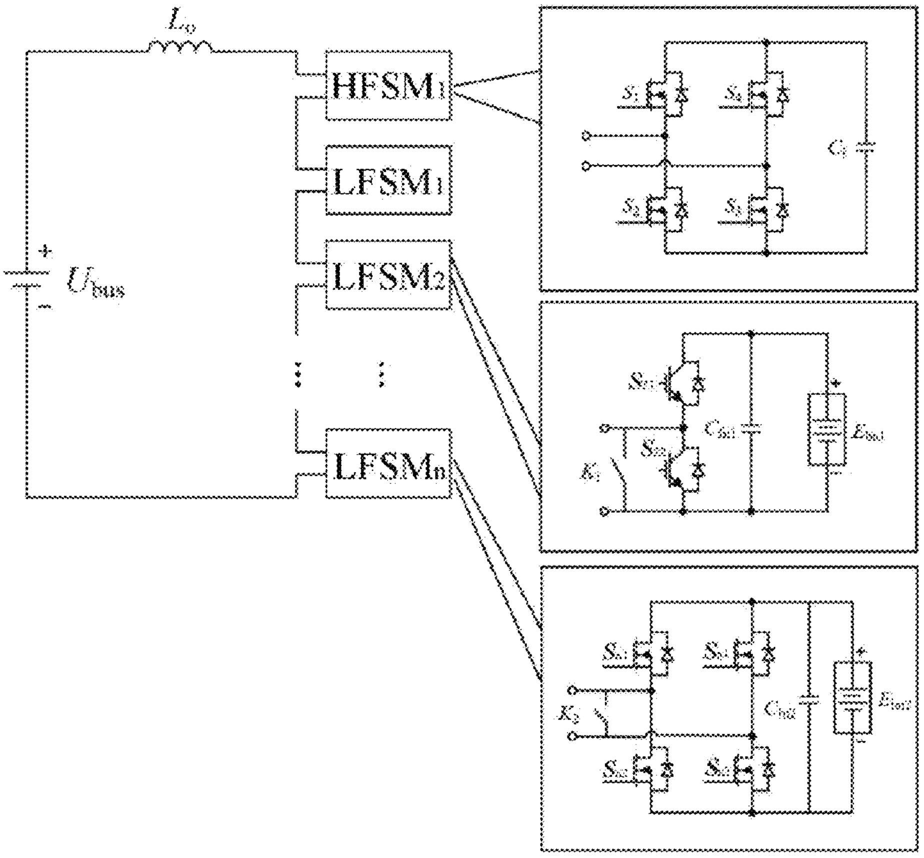
FIG. 7 is a circuit diagram showing a fifth embodiment of a hybrid DC chained energy storage converter of the present disclosure.

FIG. 7 is a circuit diagram showing a fifth embodiment of a hybrid DC chained energy storage converter of the present disclosure.

As shown in FIG. 7, in the hybrid DC chained energy storage converter of the fifth embodiment, the low frequency sub module further includes a bypass protection circuit disposed at the connection port of the second switch circuit of the low frequency sub module. For example, the bypass protection circuit may be a bypass switch. FIG. 7 shows that the bypass protection circuit is added on the basis of the third embodiment, that is, bypass switches are disposed at connection ports of the half-bridge circuits and the full-bridge circuits of the low frequency sub modules, respectively.

By further disposing the bypass protection circuit, in addition to the above functions, a faulty battery can also be effectively bypassed, a fault clearing function can be realized, and the system reliability can be improved.

With reference to FIG. 7, the function of resisting the short circuit of the switch of the upper bridge arm mentioned in the second embodiment and the third embodiment is further described.

In FIG. 7, when the low frequency sub module adopts the half-bridge circuit, if the switch $S_{21}$ of the upper bridge arm has a short-circuit fault, once the bypass switch $K_1$ connected in parallel with the switch $S_{22}$ of the lower bridge arm is closed, the short circuit of the battery pack is caused, which is very dangerous. Therefore, it can be said that the half-bridge circuit does not have the function of resisting the short circuit of the switch of the upper bridge arm.

However, when the low frequency sub module adopts the full-bridge circuit, if the switch $S_{n1}$ of the upper bridge arm has the short-circuit fault, and then the bypass switch $K_2$ is closed, the battery pack will not be in danger of short-circuit. Therefore, the full-bridge circuit has the function of resisting the short circuit of the switch of the upper bridge arm.

As described above, the function of resisting the short circuit of the switch of the upper bridge arm is achieved by using the full-bridge circuit as a part of the second switch circuits of the low frequency sub modules, so as to realize the low voltage ride-through of the DC short circuit and improve the system reliability.

As shown in FIG. 7, when the second switch circuit of the low frequency sub module adopts the half-bridge circuit, if the switch (switch $S_{21}$) of the upper bridge arm occurs the short-circuit fault, once the bypass switch $K_1$ connected in parallel with the switch $S_{22}$ of the lower bridge arm is closed, the short circuit of the battery pack is caused, which is very dangerous. Therefore, it can be said that the half-bridge circuit does not have the function of resisting the short circuit of the switch (switch $S_{21}$) of the upper bridge arm.

When the second switch circuit of the low frequency sub module adopts the full-bridge circuit, if the switch (switch $S_{n4}$ and/or $S_{n1}$) of the upper bridge arm occurs the short-circuit fault, and then the bypass switch $K_2$ is closed, the battery pack will not be in danger of short-circuit. Therefore, the full-bridge circuit has the function of resisting the short circuit of the switch (switch $S_{n4}$ and/or $S_{n1}$) of the upper bridge arm.

As described above, the function of resisting the short circuit of the switch (switch $S_{n4}$ and/or $S_{n1}$) of the upper bridge arm is also achieved by using the full-bridge circuit as a part of the second switch circuits of the low frequency sub modules, so as to realize the low voltage ride-through of the DC short circuit and improve the system reliability.

Figure 8:
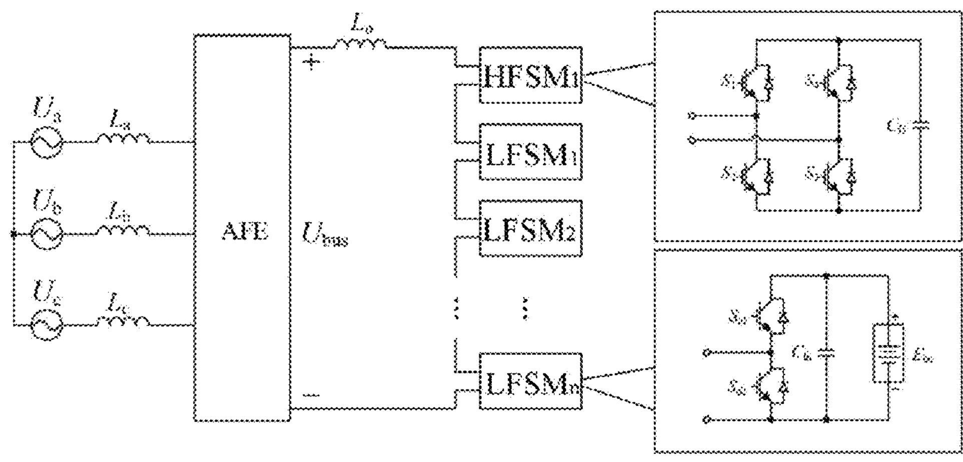
FIG. 8 is a circuit diagram showing a sixth embodiment of a hybrid DC chained energy storage converter of the present disclosure.

FIG. 8 is a circuit diagram showing a sixth embodiment of a hybrid DC chained energy storage converter of the present disclosure.

As shown in FIG. 8, the hybrid DC chained energy storage converter of the sixth embodiment may further include an active front-end circuit, an input end of the active front-end circuit may be coupled to the power grid, and an output end of the active front-end circuit may be coupled to the positive DC bus $U_{bus}+$ and the negative DC bus $U_{bus}-$. Thereby, the hybrid DC chained energy storage converter of the present disclosure can be connected to the power grid.

Figure 9:
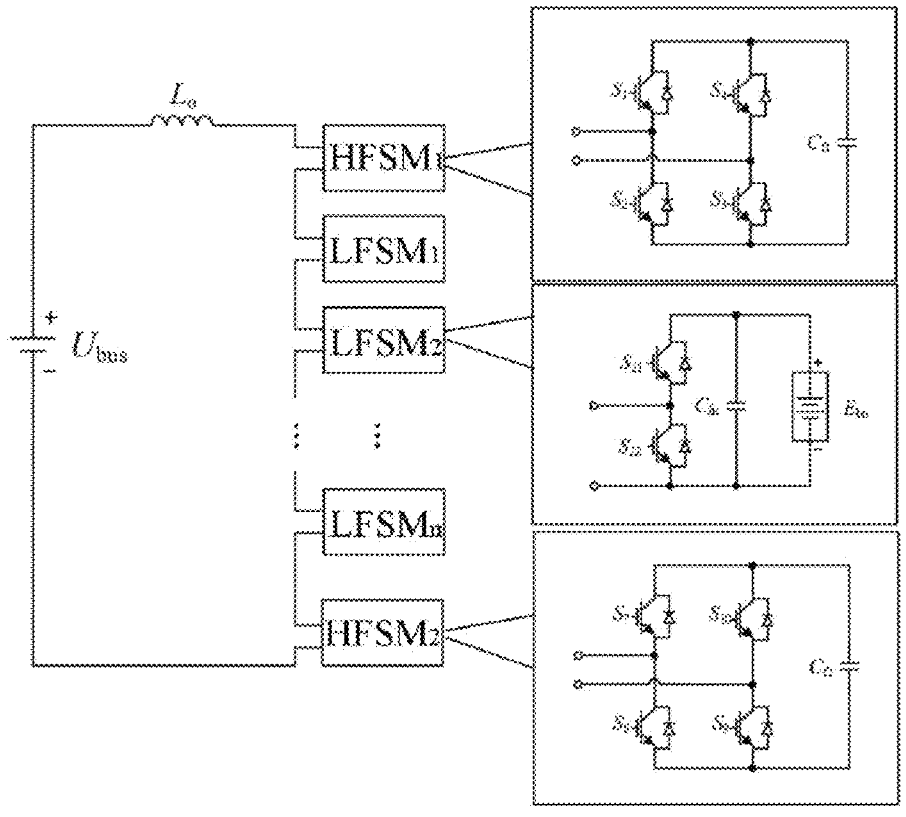
FIG. 9 is a circuit diagram showing a seventh embodiment of a hybrid DC chained energy storage converter of the present disclosure.

FIG. 9 is a circuit diagram showing a seventh embodiment of a hybrid DC chained energy storage converter of the present disclosure.

As shown in FIG. 9, in the hybrid DC chained energy storage converter of the seventh embodiment, the at least one high frequency sub module includes a plurality of high frequency sub modules $HFSM_1$ and $HFSM_2$. The main circuit inductor $L_o$, the plurality of high frequency sub modules $HFSM_1$ and $HFSM_2$ and the plurality of low frequency sub modules $LFSM_1$ to $LFSM_n$ are connected in series to form a series branch, and the series branch is connected to the positive DC bus $U_{bus}+$ and the negative DC bus $U_{bus}-$, respectively. The plurality of high frequency sub modules $HFSM_1$ and $HFSM_2$ each include the first switch circuit and the first capacitor, and the first switch circuit may be the full-bridge circuit. The plurality of low frequency sub modules $LFSM_1$ to $LFSM_n$ each include the second switch circuit and the energy storage element. All the second switch circuits may be the full-bridge circuits, or all the second switch circuits may be the half-bridge circuits, or a part of the second switch circuits may be the full-bridge circuit and the other part of the second switch circuits may be the half-bridge circuit. All the energy storage elements may be battery packs, or a part of the energy storage elements may be the battery pack and the other part of the energy storage elements may be the super capacitor. In some embodiments, the plurality of low frequency sub modules $LFSM_1$ to $LFSM_o$ each include a second capacitor connected in parallel with the energy storage element.

Figure 10:
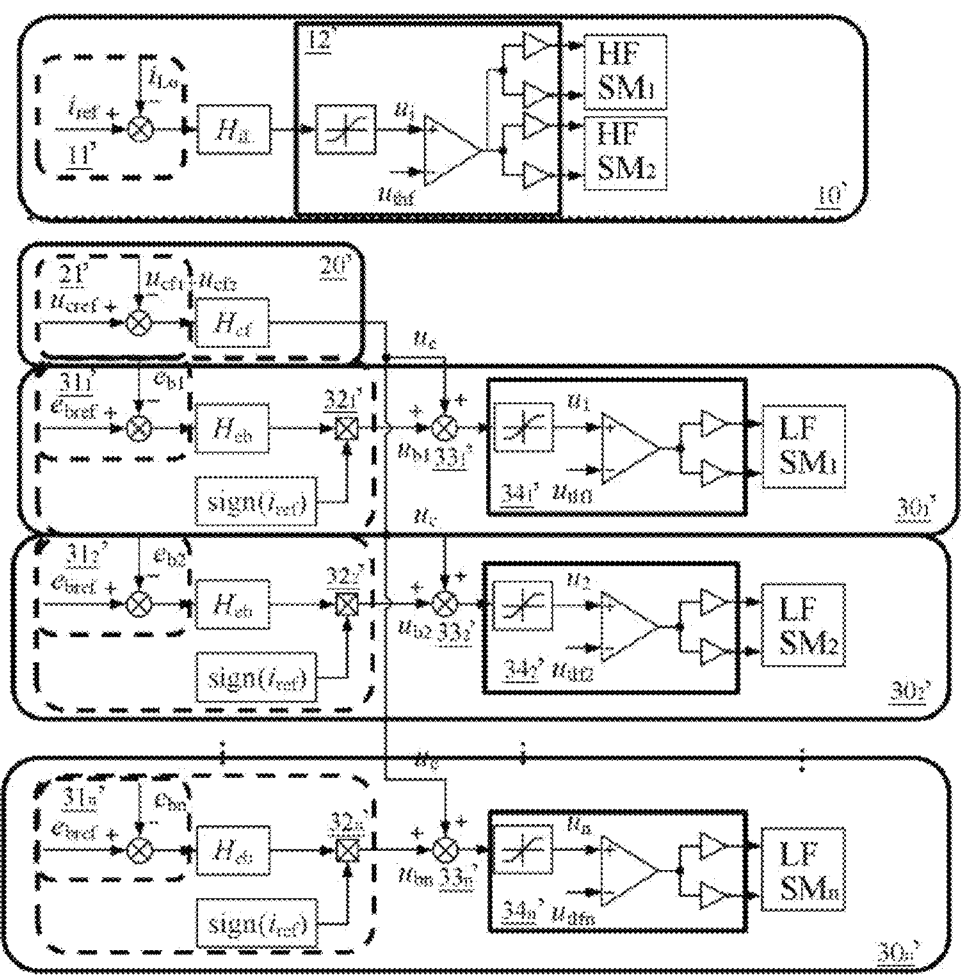
FIG. 10 is a circuit diagram showing another controller of a hybrid DC chained energy storage converter of the present disclosure.

FIG. 10 is a circuit diagram showing another controller of a hybrid DC chained energy storage converter of the present disclosure.

In the hybrid DC chained energy storage converter of the present disclosure, the controller may include: an inductor current control unit 10', configured to receive the current $i_{Lo}$ of the main circuit inductor $L_o$ and the current reference value ref and output a plurality of first control signals to control actions of first switch circuits of the high frequency sub modules $HFSM_1$ and $HFSM_2$, respectively, the plurality of first control signals may be the same, and the current reference value $i_{ref}$ can be a current instruction sent by a Battery Management System (BMS); a capacitor voltage control unit 20', configured to receive a sum of voltages $u_{cf}$ of first capacitors $C_f$ of the high frequency sub modules $HFSM_1$ and $HFSM_2$ and the first voltage reference value $U_{cref}$ and output the modulation voltage $u_c$, the first voltage reference value may be different from the first voltage reference value in FIG. 3; and energy storage voltage control units $\mathbf{30}_1$' to $\mathbf{30}_n$' in a one-to-one correspondence with the low frequency sub modules $LFSM_1$ to $LFSM_1$, configured to receive the modulation voltage $u_c$, voltages $e_{bn}$ of energy storage elements $E_{bn}$ corresponding to the energy storage voltage control units and the second voltage reference value $e_{bref}$ and output second control signals to control actions of half-bridge circuits of the low frequency sub modules $LFSM_1$ to $LFSM_n$.

In addition, in the present disclosure, it should be noted that second voltage reference values $e_{bref}$ of the energy storage voltage control units $\mathbf{30}_1$' to $\mathbf{30}_n$' may be the same or different. Setting the same second voltage reference value $e_{bref}$ can simplify the circuit. Setting different second voltage reference values $e_{bref}$ can utilize the battery in echelons, and different types of recycling batteries can be connected.

Figures 11A, 11B, 11C, 11D:
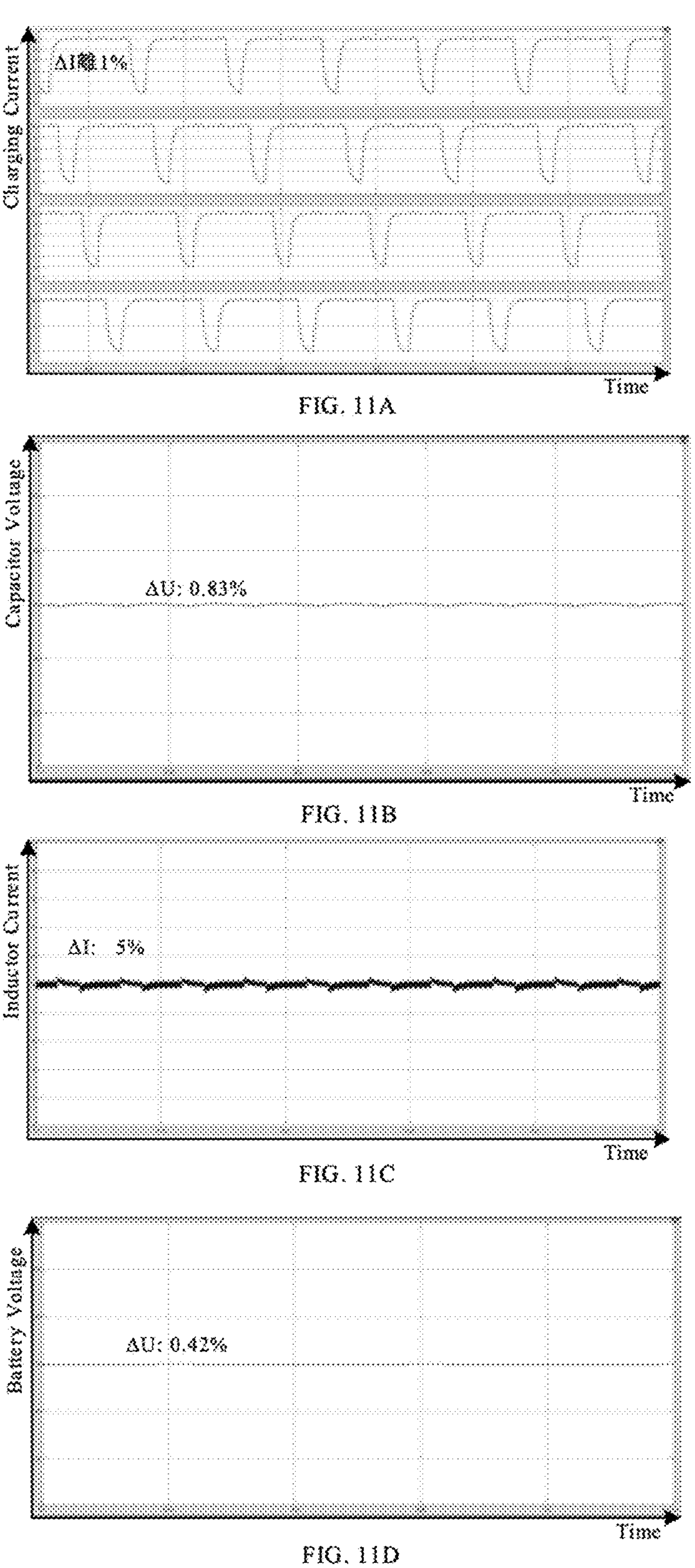
FIG. 11A~FIG. 11D are simulation waveform diagrams showing a hybrid DC chained energy storage converter of the present disclosure.

FIG. 11A~FIG. 11D show simulation waveform diagrams of a hybrid DC chained energy storage converter of the present disclosure. FIG. 11A shows charging current waveform diagrams of four energy storage elements. FIG. 11B shows capacitor voltage waveform diagram in HFSM. FIG. 11C shows current waveform diagram of a main circuit inductor. FIG. 11D shows voltage waveform diagram of a battery pack in LFSM. As can be seen from the simulation waveform shown in FIG. 11A, charging current waveforms of four battery packs are phase-shifted with each other, and the battery packs achieve the pulse charging with a current ripple of 1% during charging. As can be seen from the simulation waveform shown in FIG. 11B, a capacitor voltage waveform in the high frequency sub module is stable, and a voltage ripple is 0.83%. As can be seen from the simulation waveform shown in FIG. 11C, the current of the main circuit inductor $L_o$ is stably controlled, and the current ripple is 5%. As can be seen from the simulation waveform shown in FIG. 11D, the voltage waveform of the battery pack in the low frequency sub module is stable, and the voltage ripple is 0.42%. Therefore, the hybrid DC chained energy storage converter can work stably with good control performance.

As described above, in the hybrid DC chained energy storage converter of the present disclosure, a temperature of the battery pack is controllable by grouping and packaging batteries, and old and new batteries can be used in echelons, thus solving the problem of battery thermal management.

In addition, in the hybrid DC chained energy storage converter of the present disclosure, battery sub modules are in a cascaded mode, and the medium-voltage DC distribution network is directly hung, which greatly reduces the conversion link, improves the cycle efficiency, and solves the problem of low battery cycle efficiency.

In addition, in the hybrid DC chained energy storage converter of the present disclosure, the battery sub modules are in the cascaded mode, the pulse power is outputted in turn, and the power grid power is smooth without impact, which solves the problem of the impact of the pulse charging on the power grid.

In addition, in the hybrid DC chained energy storage converter of the present disclosure, the pulse charging method is used to weaken a polarization effect of the battery, which prolongs a service life of the battery, and solves the problem of fast battery life and capacity fading.

As above, the present disclosure effectively overcomes various shortcomings in the prior art and has high industrial application value.

The above embodiments merely exemplify principles and effects of the present disclosure, but are not intended to limit the present disclosure. Any skilled in the art can modify or change the above embodiments without departing from the spirit and scope of the present disclosure. Therefore, all equivalent modifications or changes made by those with ordinary knowledge in the art without departing from the spirit and technical idea disclosed in the present disclosure shall still be covered by the claims of the present disclosure.

What is claimed is:

1. A hybrid Direct Current (DC) chained energy storage converter, comprising:

a positive DC bus;

a negative DC bus;

a main circuit inductor;

at least one high frequency sub module, comprising a first switch circuit and a first capacitor, wherein the first switch circuit is connected in parallel with the first capacitor;

a plurality of low frequency sub modules, wherein each low frequency sub module comprises a second switch circuit and an energy storage element, the second switch circuit is connected in parallel with the energy storage element, and wherein the main circuit inductor, the at least one high frequency sub module and the plurality of low frequency sub modules are connected in series to form a series branch, and the series branch is connected to the positive DC bus and the negative DC bus, respectively; and a controller, coupled to the first switch circuit of the at least one high frequency sub module and the second switch circuits of the plurality of low frequency sub modules, respectively, wherein the controller is configured to control the first switch circuit of the at least one high frequency sub module according to a current flowing through the main circuit inductor, and control the second switch circuits of the plurality of low frequency sub modules according to a voltage across the first capacitor of the at least one high frequency sub module and voltages of a plurality of energy storage elements.

2. The hybrid DC chained energy storage converter according to claim 1, wherein the first switch circuit is a full-bridge circuit.

3. The hybrid DC chained energy storage converter according to claim 1, wherein the second switch circuit is a half-bridge circuit or a full-bridge circuit.

4. The hybrid DC chained energy storage converter according to claim 3, wherein each low frequency sub module further comprises a second capacitor, and the second capacitor is connected in parallel with the energy storage element.

5. The hybrid DC chained energy storage converter according to claim 4, wherein:

each low frequency sub module further comprises an inductor; and the inductor is connected to the energy storage element and the second capacitor, respectively.

6. The hybrid DC chained energy storage converter according to claim 1, wherein the plurality of energy storage elements comprise battery packs or the combination of the battery packs and super capacitors.

7. The hybrid DC chained energy storage converter according to claim 1, wherein each low frequency sub module further comprises a bypass unit disposed at an input end of the low frequency sub module.

8. The hybrid DC chained energy storage converter according to claim 1, further comprising:

an active front-end circuit, wherein an input end of the active front-end circuit is coupled to a power grid, and an output end of the active front-end circuit is coupled to the positive DC bus and the negative DC bus.

9. The hybrid DC chained energy storage converter according to claim 1, wherein the controller comprises:

an inductor current control unit, configured to receive the current flowing through the main circuit inductor and a current reference value, and output a first control signal to control the first switch circuit of the at least one high frequency sub module;

a capacitor voltage control unit, configured to receive the voltage across the first capacitor of the at least one high frequency sub module and a first voltage reference value, and output a modulation voltage; and a plurality of energy storage voltage control units in a one-to-one correspondence with the plurality of low frequency sub modules, wherein each energy storage voltage control unit is configured to receive the modulation voltage, a voltage of an energy storage element of the low frequency sub module corresponding to the energy storage voltage control unit and a second voltage reference value, and output a second control signal to control the second switch circuit of the low frequency sub module corresponding to the energy storage voltage control unit.

10. The hybrid DC chained energy storage converter according to claim 9, wherein a plurality of second voltage reference values are equal.

11. The hybrid DC chained energy storage converter according to claim 9, wherein the inductor current control unit comprises a first calculation unit, a current loop regulator and a first generation unit for generating the first control signal;

the first calculation unit is configured to receive the current flowing through the main circuit inductor and the current reference value and calculate a current calculation value, the current loop regulator is configured to receive the current calculation value and output a first voltage, and the first generation unit is configured to receive the first voltage and a first carrier signal, and output the first control signal to control the first switch circuit of the at least one high frequency sub module.

12. The hybrid DC chained energy storage converter according to claim 9, wherein the capacitor voltage control unit comprises a second calculation unit and a capacitor voltage loop regulator, the second calculation unit is configured to receive the voltage across the first capacitor of the at least one high frequency sub module and the first voltage reference value, and calculate a first voltage calculation value, and the capacitor voltage loop regulator is configured to receive the first voltage calculation value and output the modulation voltage.

13. The hybrid DC chained energy storage converter according to claim 12, wherein:

the at least one high frequency sub module comprises a plurality of high frequency sub modules; and the second calculation unit is configured to receive a sum of voltages of a plurality of first capacitors and the first voltage reference value, and calculate the first voltage calculation value.

14. The hybrid DC chained energy storage converter according to claim 9, wherein:

each energy storage voltage control unit comprises a third calculation unit, an energy storage voltage loop regulator, a fourth calculation unit, a fifth calculation unit, and a second generation unit for generating the second control signal;

the third calculation unit is configured to receive the voltage of the energy storage element of the low frequency sub module corresponding to the energy storage voltage control unit and the second voltage reference value, and calculate a second voltage calculation value;

the energy storage voltage loop regulator is configured to receive the second voltage calculation value and output a second voltage;

the fourth calculation unit is configured to receive the second voltage and a symbol value of the current reference value, and calculate a third voltage calculation value;

the fifth calculation unit is configured to receive the third voltage calculation value and the modulation voltage, and calculate a fourth voltage calculation value; and the second generation unit is configured to receive the fourth voltage calculation value and a second carrier signal and output the second control signal to control the second switch circuit of the low frequency sub module corresponding to the energy storage voltage control unit.

15. A method for controlling the hybrid Direct Current (DC) chained energy storage converter as claimed in claim 1, comprising:

detecting a current flowing through the main circuit inductor;

controlling the first switch circuit of the at least one high frequency sub module according to the current flowing through the main circuit inductor;

detecting a voltage across the first capacitor of the at least one high frequency sub module;

detecting the voltages of the plurality of energy storage element; and controlling the second switch circuits of the plurality of low frequency sub modules according to the voltage across the first capacitor of the at least one high frequency sub module and voltages of a plurality of energy storage elements.

16. The method according to claim 15, further comprising:

(i) receiving the current flowing through the main circuit inductor and a current reference value, and outputting a first control signal to control the first switch circuit of the at least one high frequency sub module;

(ii) receiving the voltage across the first capacitor of the at least one high frequency sub module and a first voltage reference value, and outputting a modulation voltage; and (iii) receiving the modulation voltage, a voltage of a corresponding energy storage element and a second voltage reference value, and outputting a second control signal to control a second switch circuit of a corresponding low frequency sub module.

17. The method according to claim 16, wherein the step (i) further comprises:

receiving, by a first calculation unit, the current flowing through the main circuit inductor and the current reference value and calculating a current calculation value;

receiving, by a current loop regulator, the current calculation value and outputting a first voltage; and receiving, by a first generation unit, the first voltage and a first carrier signal and outputting the first control signal to control the first switch circuit of the at least one high frequency sub module.

18. The method according to claim 16, wherein the step (ii) further comprises:

receiving, by a second calculation unit, the voltage across the first capacitor of the at least one high frequency sub module and the first voltage reference value and calculating a first voltage calculation value; and receiving, by a capacitor voltage loop regulator, the first voltage calculation value and outputting the modulation voltage.

19. The method according to claim 18, wherein the step (ii) further comprises:

receiving, by the second calculation unit, a sum of voltages of a plurality of first capacitors and the first voltage reference value, and calculating the first voltage calculation value.

20. The method according to claim 16, wherein the step (iii) further comprises:

receiving, by a third calculation unit, the voltage of the corresponding energy storage element and the second voltage reference value and calculating a second voltage calculation value;

receiving, by an energy storage voltage loop regulator, the second voltage calculation value and outputting a second voltage;

receiving, by a fourth calculation unit, the second voltage and a symbol value of the current reference value and calculating a third voltage calculation value;

receiving, by a fifth calculation unit, the third voltage calculation value and the modulation voltage and calculating a fourth voltage calculation value; and receiving, by a second generation unit, the fourth voltage calculation value and a second carrier signal, and outputting the second control signal to control the second switch circuit of the corresponding low frequency sub module.

* * * * *